May 28, 1968  R. FRATILA ET AL  3,386,055

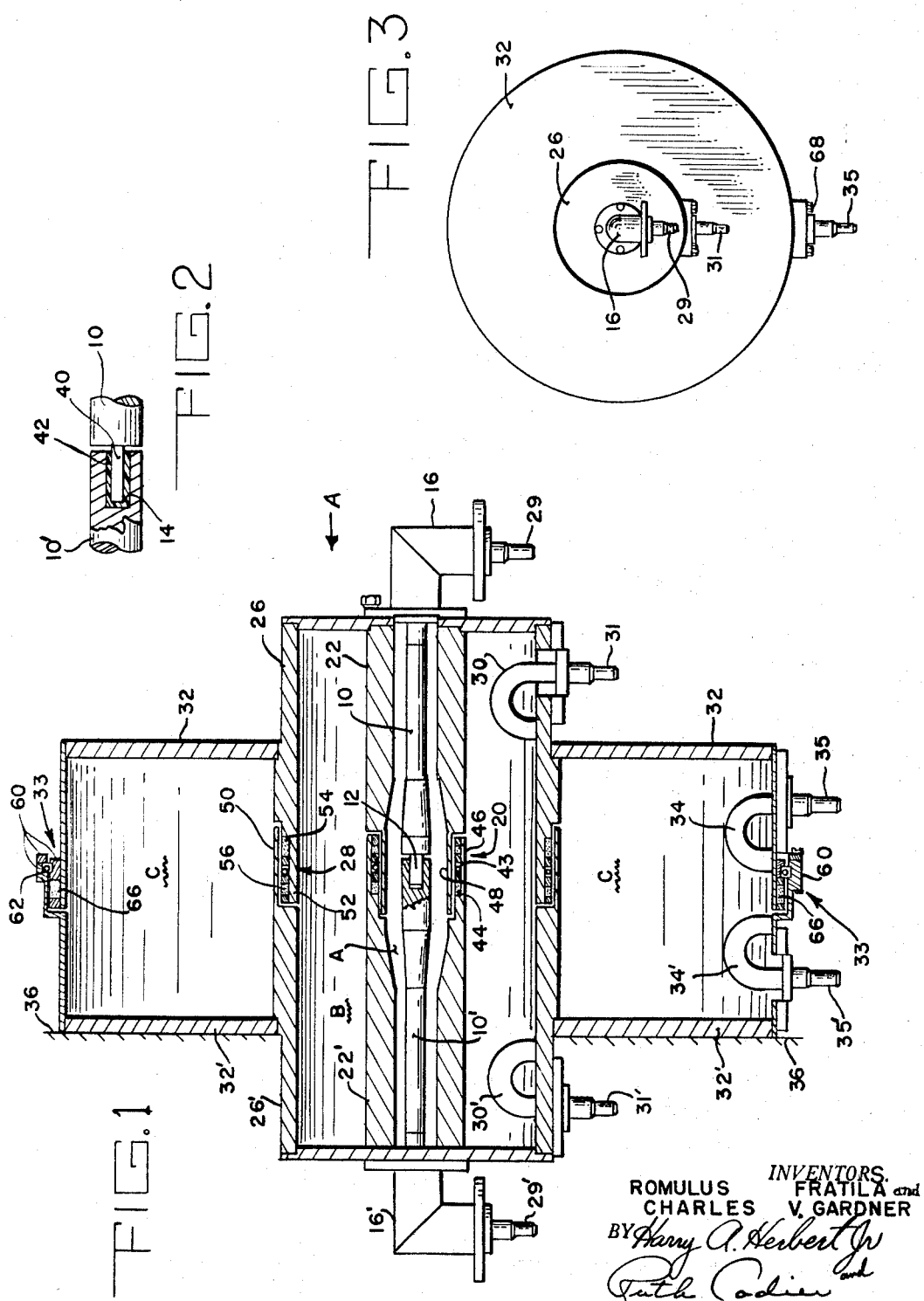

THREE-WAY ROTARY JOINT FOR WAVEGUIDES

Filed Jan. 18, 1966  2 Sheets-Sheet 2

INVENTORS.
ROMULUS FRATILA and
CHARLES V. GARDNER
BY
ATTORNEYS

United States Patent Office 3,386,055
Patented May 28, 1968

3,386,055
THREE-WAY ROTARY JOINT FOR WAVEGUIDES
Romulus Fratila, Springfield, and Charles V. Gardner, Gainesville, Va., assignors to the United States of America as represented by the Secretary of the Air Force
Filed Jan. 18, 1966, Ser. No. 521,463
1 Claim. (Cl. 333—98)

ABSTRACT OF THE DISCLOSURE

Three drum-like concentrically arranged elements form three concentric waveguide cavities, each with input and output to a transmission line. Each drum comprises two sections joined midway the ends of each for rotation of one end section of each drum with respect to the section to which it is attached.

---

The present invention relates to a three-way rotary joint, and more particularly to a rotatable joint structure for use in microwave transmission circuits wherein three or more energy waves of different frequency value may be simultaneously and continuously transmitted and received.

None of the old methods provide uninterrupted waveguide channels while continuously rotating one portion of the waveguide. This is the situation where waveguide transmission lines are required to carry multiple channel microwave intelligence to and from a rotatable element, or as a mounting platform for rotating radar antennas.

Old methods include non-continuous rotation and/or rotation about an axis non-concentric to the three separate channels. This involves the use of multiple, single channel units.

The object of the present invention is the provision of a joint for application to waveguide transmission and receiving lines, wherein three or more separate power channels are arranged in concentric configuration, each with input and output terminals which may be rotated continuously with respect to one another about a concentric axis without interruption of any one of the waveguide transmission lines.

These and other advantages, features and objects of the invention will become more apparent from the following description taken in connection with the illustrative embodiments in the accompanying drawings, wherein:

FIG. 1 is a longitudinal cross-sectional view of one form of the device through the center thereof;

FIG. 2 is a detail view of an alternative form of the central conductor joint;

FIG. 3 is an end view of the device looking in the direction of the arrow A in FIG. 1;

Referring more in detail to the drawing wherein like numerals refer to like parts in the several figures of the drawing:

Figures 4, 5:
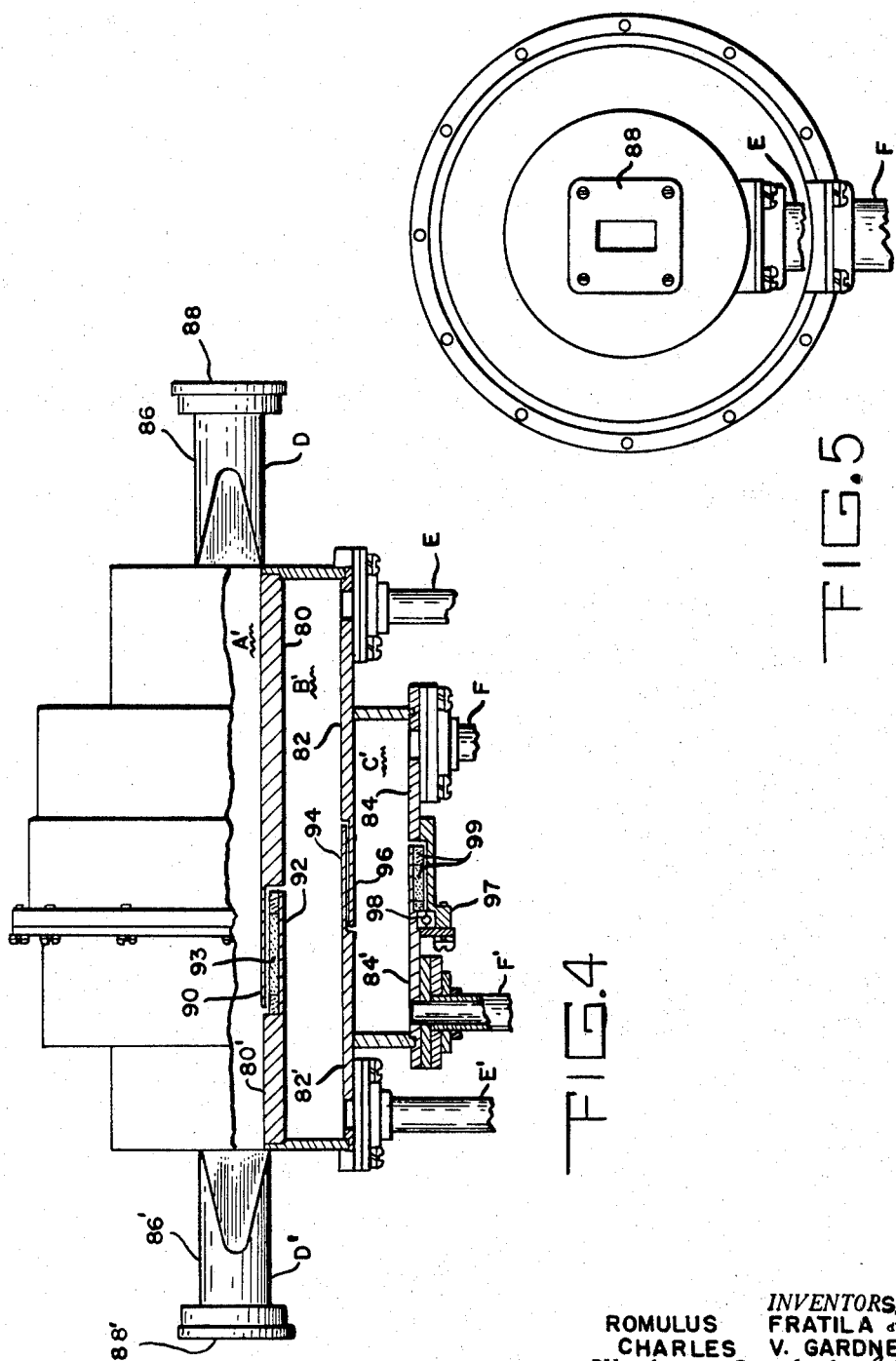
FIG. 4 is a view partly in cross-section and partly in elevation of a modified form of the device.
FIG. 5 is an end view of the device shown in FIG. 4.

Two sections 10 and 10′ of a central conductor element are joined by a means 12 capable of allowing relative rotations of elements 10 and 10′. A pin and socket joint is shown in FIG. 1, and reinforced by a Teflon spacing and bearing element 14 see FIG. 2. The portions 10 and 10′ of the central conductor connect through coaxial elbow joints 16–16′ to transmission lines 29–29′.

The sections 22 and 22′ of a tubular element, are joined by a bearing 20, having cavities, if desired, filled with dielectric material later described. The tubular element 22 and 22′ is concentric with the central element 10–10′ and forms an inner and central waveguide cavity A.

Proceeding from the center outward, a second tubular member is divided into sections 26–26′ by a suitable bearing element 28. The tubular member 26–26′ is mounted concentrically with the members 10–10′ and 22–22′ and being larger in diameter than 22–22′, it forms a second waveguide cavity B whose input and output elements to transmisison lines 31–31′ are shown as loup field couplings 30–30′.

A third tubular member 32–32′, joined by the bearing joint 33 is also mounted in concentric relationship to the inner members of the device and forms a third resonating cavity having loup field couplings 34–34′, to transmission lines 35–35′.

The length of each drum-like member, 22, 26 and 32 decreases providing space for the loup couplings 16–16′, 30–30′ and 34–34′.

The device may be mounted as desired, as for example, to a structure indicated at 36 in FIG. 1. All of the prime numbered elements will then be stationary and those to the right as shown in FIG. 1 will be free to rotate.

As will now be seen three concentric waveguides are formed, portions of the walls of which are free to rotate without interruption of transmission or reception through any of the waveguide channels.

The character of the bearings or joints which connect the end sections of each cylinder are important. Again referring to FIG. 1, the elements 10–10′ of the central conductor are provided with a reduced end 40, and a receiving bore 42, respectively, and selectively a dielectric spacer such as the Teflon member 14. The inner surface of the cylindrical wall members 22–22′ defining the outer wall of the waveguide cavity A and the inner wall of the second transmission line cavity B, is reduced at its inner end portion to form a recess for receiving the bearings 43 and the dielectric elements 44 and 46. The space is closed by a complementary inner annular flange 48 on the member 22.

A similar bearing is provided for the wall members 26–26′ allowing them relative rotation. An outer annular lip 50 on the member 26′ and an inner annular lip 52 on the member 26 form a space which accommodates the bearing 28 and the dielectric elements 54–56.

For the joined sections 32–32′ of the outer resonating cavity C, bearing retainers 60 provide space for the bearing 62 and the dielectric elements 66. The bearing retainers also provide a means for securing the inlet and outlet sections of the device as at 68.

In the form of the device shown in FIGS. 4 and 5, three concentric waveguide channels, A′, and inner circular cavity, B′, a second transmission line cavity and C′ the outer resonant cavity, are formed with concentric conducting and segmented wall elements 80–80′, 82–82′, 84–84′. These elements, as above described in connection with FIGS. 1–3, are joined for rotary movement of the entire inlet end unit of the device with respect to the outlet end.

Transition elements 86–86′ adapt a square or rectangular wave guide 88–88′ to connect to the circular unit necessary for forming an element relatively rotatable with respect to another element.

The sections 80–80′ are formed at their inner joining ends with complementary flange or lip portions 90 and 92 which fit together to form a space between them for dielectric material 93. If no dielectric is used, as between the complementary flanges 94 and 96 of the elements 82 and 82′, graphite or equivalent is used for the bearing surfaces. The joint for the outer or resonating cavity C′ may secure the two end sections together. The bearing retainer 97 provides space for bearings and dielectric 99. Transmission line connections for the cavities A, B and C are shown at D, D′, E, E′, and F, F′.

Although the invention has been described with reference to particular embodiments, it will be understood to those skilled in the art that the invention is capable of a variety of alternative embodiments within the spirit and scope of the appended claim.

We claim:

1. In a rotary joint structure for use in microwave transmission circuits, a center conductor comprised of two sections mounted for relative rotation with respect to each other and axially located, a first cylindrical member concentric with said center conductor and of such diameter as to form a central microwave transmission cavity, a second cylindrical member of larger diameter than said first cylindrical member and concentrically located with respect thereto, forming a second microwave transmission cavity, a third cylindrical member concentrically located with respect to said central conductor and larger in diameter than said second cylindrical member to form a third resonating cavity for microwave transmision, each of said cylindrical members being divided midway the end portions of each and each provided at the location of the division with a bearing whereby one end of each individual cylindrical member may rotate with respect to the other end thereof, each microwave transmission cavity being provided with input and output connections to transmission lines whereby uninterrupted wave transmission may take place continuously and separtely through each cavity.

References Cited

UNITED STATES PATENTS 2,584,399  2/1952  Preston.
2,763,844  9/1956  Kruger.
3,281,728  10/1966  Doine.

HERMAN KARL SAALBACH, *Primary Examiner.*

L. ALLAHUT, *Assistant Examiner.*